United States Patent
Coldrey et al.

(10) Patent No.: US 8,483,310 B2
(45) Date of Patent: Jul. 9, 2013

(54) METHOD OF AND A DEVICE FOR PRECODING TRANSMIT DATA SIGNALS IN A WIRELESS MIMO COMMUNICATION SYSTEM

(75) Inventors: Mikael Coldrey, Landvetter (SE); Fredrik Athley, Kullavik (SE); Ulf Lindgren, Västra Frölunda (SE); Sven Oscar Petersson, Sävedalen (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 311 days.

(21) Appl. No.: 12/919,301

(22) PCT Filed: Feb. 25, 2008

(86) PCT No.: PCT/EP2008/001466
§ 371 (c)(1),
(2), (4) Date: Aug. 25, 2010

(87) PCT Pub. No.: WO2009/106090
PCT Pub. Date: Sep. 3, 2009

(65) Prior Publication Data
US 2011/0002414 A1    Jan. 6, 2011

(51) Int. Cl.
*H04K 1/02*    (2006.01)
(52) U.S. Cl.
USPC .......................................... 375/295; 375/259
(58) Field of Classification Search
USPC .................. 370/208, 343; 375/259, 267, 269, 375/299; 704/1
See application file for complete search history.

(56) References Cited

U.S. PATENT DOCUMENTS

| | | | |
|---|---|---|---|
| 2002/0187753 A1* | 12/2002 | Kim et al. | 455/69 |
| 2004/0042439 A1 | 3/2004 | Menon et al. | |
| 2006/0148427 A1* | 7/2006 | Hamalainen et al. | 455/101 |
| 2008/0192849 A1* | 8/2008 | Kim et al. | 375/260 |
| 2010/0189079 A1* | 7/2010 | Eichinger et al. | 370/335 |

OTHER PUBLICATIONS

Zukang Shen et al: "Comparison of space-time water-filling and spat; al water-filling for MIMO fading .channels" Global Telecommunications' Conference, 2004. GLOBECOM . ,04. IEEE Dallas, TX, USA Nov. 29-Dec. 3, 2004, Piscataway, NJ,: USA, IEEE, vol. 1, pp. 431-435, XP010758925 ISBN: 978-0-7803-8794-2 p. 431-p. 432.
Hui Shi et al: "An iterative transmission power allocation scheme for MIMO-OFDM systems" Vehicular Technology Conference, 2004. VTC2004—Fall. 2004 IEEE 60th Los Angeles, CA, USA,Sep. 26-29, 2004, Piscataway, NJ, USA,IEEE, vol. 7, pp. 4828-4832. XPOI0790332 ISBN: 978-0-7803-8521-4 p. 4828-p. 4829.

* cited by examiner

*Primary Examiner* — Leon-Viet Nguyen

(57) ABSTRACT

A method of and a precoding device and a communication device for precoding transmit data signals in a wireless Multiple-Input Multiple-Output, MIMO, channel transmission scheme for maximizing channel capacity of the MIMO system given available amounts of transmit power. The precoding is expressed in a complex precoding matrix (W), which is calculated involving individual transmit power constraints of the multiple outputs ($71, \ldots, 7t$) of the MIMO channel. The individual transmit power constraints are comprised of predetermined individual output transmit power amplifier ($PA1, \ldots, PAt$) limitations.

15 Claims, 5 Drawing Sheets

METHOD OF AND A DEVICE FOR PRECODING TRANSMIT DATA SIGNALS IN A WIRELESS MIMO COMMUNICATION SYSTEM

TECHNICAL FIELD

The present invention relates generally to wireless communications and, more specifically, to precoding of transmit data signals in a Multiple-Input Multiple-Output, MIMO, wireless data signal transmission scheme.

BACKGROUND OF THE INVENTION

From a transmission perspective, wireless communication systems have evolved from relatively simple Single-Input Single-Output (SISO) systems, wherein a mobile device communicates with wireless access equipment over a single transmission channel, to Multiple-Input Multiple-Output (MIMO) systems supporting high transmission rate multimedia communications sharing available system resources such as transmission channels, system power, transmit and receive equipment, etcetera. In a MIMO system, both the transmit and receive sides are equipped with multiple antennas for data transmission.

MIMO systems operate in various wireless access methods, such as but not limited to Code Division Multiple Access (CDMA), Time Division Multiple Access (TDMA), Frequency Division Multiple Access (FDMA), Orthogonal Frequency Division Multiple Access (OFDMA), and the like.

With the MIMO technique, given multiple antennas, the spatial and/or the polarization dimension can be exploited to significantly improve the performance of the wireless transmission and to produce significant capacity gains over SISO systems using the same bandwidth and transmit power.

MIMO systems transmit signals from different transmit antennas and the receiving antennas receive a superposition of all the transmitted signals. Since the receiver detects the same signal several times at different positions in space at least one position should not be in a fading dip. Three main categories of MIMO can be distinguished, spatial or polarization multiplexing, diversity coding, and precoding.

In spatial or polarization multiplexing, a high rate signal is split into multiple lower rate streams and each stream is transmitted from a different transmit antenna in the same frequency channel.

In diversity coding a single stream (unlike multiple streams in spatial or polarization multiplexing) is transmitted, but the signal is coded using techniques called space-time coding. The signal is emitted from each of the transmit antennas using certain principles of full or near orthogonal coding. Diversity exploits the independent fading in the multiple antenna links to enhance signal diversity.

Precoding, sometimes viewed as beamforming, is a scheme wherein the same signal is emitted from each of the transmit antennas with appropriate weighting. The benefits of the weighting are to increase the signal gain and/or to reduce interference from other users of the communication system. Precoding requires knowledge of the Channel State Information (CSI) at the transmitter.

In wireless communication systems equipped with multiple antennas at both transmit and receive sides, a common problem is how to transmit signals in an optimal way. For example, if the wireless channel is known to the transmitter then one can employ optimal precoding over the channel modes combined with power allocation according to the well-known waterfilling principle.

Waterfilling in wireless MIMO systems is based on the assumption of a total transmit power constraint. The waterfilling solution often allocates all of the total transmit power over only one or a few transmit antennas or PA's (power amplifiers) driving the transmit antennas. In practice, the total transmit power constraint typically leads to infeasible solutions since its power distribution may exceed individual output power limitations of transmit signals or PA's. Further, the waterfilling solution is an iterative process that consumes valuable data processing power.

SUMMARY OF THE INVENTION

An object of the present invention is to provide precoding in a wireless MIMO system avoiding infeasible power distributions while using an available amount of transmit power in an optimal manner for maximizing the channel capacity of the MIMO system.

Another object of the invention is to provide an easy to implement precoding scheme not having to rely on iterative procedures, thereby saving valuable signal processing power.

A further object of the invention is to provide a precoding device and a communication device arranged for precoding, for use in a wireless communication system.

In a first aspect, the invention provides a method of precoding transmit data signals in a wireless MIMO channel transmission scheme for maximizing channel capacity given available amounts of transmit power. A complex precoding matrix is calculated involving individual transmit power constraints of the multiple outputs.

In the precoding method according to the invention, unlike the prior art, the transmit power constraints of the individual outputs and the available total amount of transmit power are taken into account in an optimal way, thereby effectively avoiding an infeasible solution while using all of the available transmit power resources to their maximum. It is noted that the introduced transmit power constraints yield a precoding solution that typically does not involve transmitting in the orthogonal eigenmodes of the channel as opposed to the case where the power pool is unconstrained.

An example of individual output transmit power constraints are limitations of the power amplifier(s) driving the transmit antennas. With the precoding according to invention infeasible solutions in practical implementations in that the power amplifier(s) can not deliver the required power distribution are effectively avoided.

In an example of the invention, a complex covariance matrix of transmit antenna signals of the MIMO channel transmission scheme involving individual transmit power constraints is defined. This precoder covariance matrix equals the matrix product of the precoding matrix and the Hermitian of the precoding matrix, assuming that the data streams are mutually uncorrelated.

In a further example of the invention, the real valued diagonal elements of the precoder covariance matrix equal the transmit power constraints of each antenna.

In accordance with the invention, the channel capacity may be expressed as a function of the precoder covariance matrix, a channel matrix having a dimension equal to the receive antennas and the number of transmit antennas of the MIMO scheme and a complex noise covariance matrix, wherein the precoding matrix is calculated by maximizing the channel capacity subject to the individual transmit power constraints.

For maximizing the channel capacity, in an example of the invention, in finding the optimal covariance matrix, the method of Lagrange multipliers may be used, taking the available amount of transmit powers into account.

Valid solutions are obtained for non-singular matrices. To guarantee non-singularity, the channel matrix and the noise covariance matrix are of full rank. That is, the number of transmit antennas or transmit ports involved in the precoding does not exceed the number of receive antennas of the MIMO system.

It is noted that non-singular matrices is not a prerequisite of the present invention. With singular matrices one always can solve the Lagrange optimization problem by using standard numerical optimization techniques.

In finding the optimal covariance matrix using Lagrange optimization, relatively small power levels of the individual transmit power constraints of each antenna may result in an indefinite matrix, which makes the solution erroneous.

This indefiniteness problem can be solved, in a further example of the invention, by introducing diagonal loading. That is, when the number of transmit antennas equals two and if the maximization renders the optimal covariance matrix indefinite, diagonal loading is introduced by adding to the optimal covariance matrix an identity matrix scaled by the magnitude of the smallest eigenvalue of the optimal covariance matrix.

In the case of larger MIMO systems, that is having more than two transmit antennas or transmit ports, in a yet further example of the invention, a scaling of the channel matrix is introduced by multiplying the channel matrix by a scalar in the interval zero to one and choosing the scalar such that the optimal covariance matrix becomes positive semi-definite.

The precoding scheme according to the present invention solves the problem of having to deal with individual output power constraints of the MIMO system outputs and is available in closed-form and, thus, very easy to implement without iterative calculations or processing.

In a second aspect, the invention provides a transmit data signal precoding device for precoding transmit data signals in a wireless MIMO channel transmission scheme by using a complex precoding matrix involving individual transmit power constraints of the multiple transmit data signal outputs. The precoding matrix is generated in accordance with the method of the invention as disclosed above.

The present precoding device takes the power constraints of an output channel, such as PA limitations, into account and uses all of the power resources to their maximum.

In a third aspect, the invention provides a communication device comprising a transmit data signal encoding and modulation device cascaded by a precoding device for precoding transmit data signals in a wireless MIMO channel transmission scheme. The precoding matrix is generated in accordance with the method of the invention as disclosed above For use in a wireless communication system, such as but not limited to a CDMA, a TDMA, an FDMA and an OFDMA wireless communication system, the communication device according to the invention is comprised as either one of a wireless access device, also called radio base station, and a wireless user device, also called mobile device or user terminal.

Because the precoding device according to the invention does not require iterative calculations or processing, it is particularly suitable for use in a wireless user device in which battery power normally is scarce.

Various aspects of the invention will now be illustrated in more detail with reference to the following description and accompanying drawings. The examples of the invention disclosed are indicative for implementing the invention and are not intended nor to be construed as limiting the invention, the scope of which is defined by the appending claims.

DETAILED DESCRIPTION OF EXAMPLES OF THE INVENTION

In the following description, structures and devices which may be regarded known to the skilled person are shown in a general block diagram form, to facilitate the understanding of the invention.

In the present description and claims, terms like "module", "device", "apparatus", "system" and the like refer to a computer or processor related entity, either hardware, firmware, software or any combination thereof, which may be integrated into a single component or separate and provided with suitable interfaces for data exchange.

Figure 1:
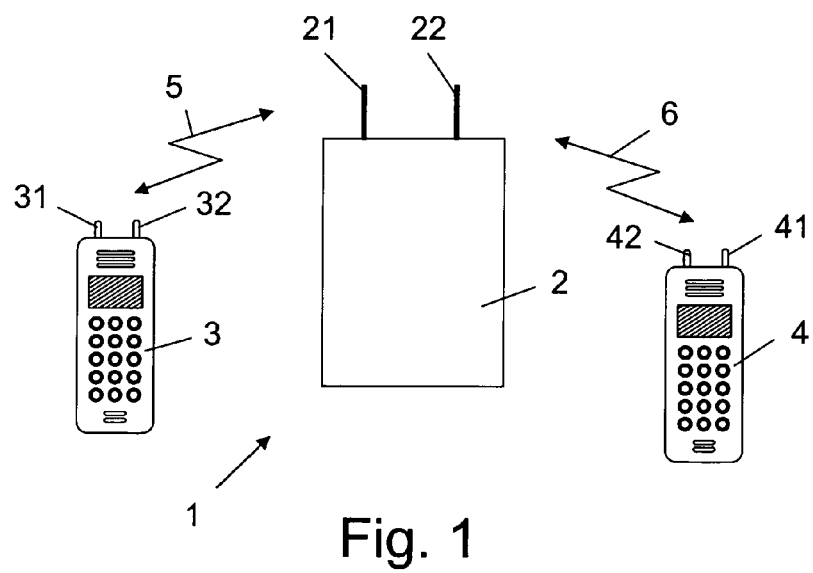
FIG. 1 shows, in a schematic and illustrative manner, a wireless communication system in accordance with the invention.

FIG. 1 shows, in a very simplified manner, a wireless communication system 1 comprising a wireless access device 2 or radio base station, arranged for wireless radio communication 5, 6 with a plurality of wireless user devices or user terminals 3, 4 in accordance with a Multiple-Input Multiple-Output (MIMO) wireless data signal transmission scheme of the present invention.

The user devices 3, 4 are shown in the form of a wireless cellular telephone. However, the user devices 3, 4 may take any form of communication device such as a smart phone, laptop, global positioning device, personal digital assistant, or any other device suitable for any type of wireless communications, such as but not limited to speech, video, audio, telemetry, application data, signalling data, etcetera. In the remainder of the description and the claims, each such communication type is generally indicated by the term data.

The wireless access device 2 forms part of a wireless transmission system, such as a cellular radio transmission system, comprising a plurality of wireless access devices 2 which may connect to a wireless switching centre and/or a fixed switching centre for access to a landline communication system, such as a PSTN (Public Switched Telephone Network) or ISDN (Integrated Services Digital Network), an IMS (IP Multimedia System) or any other telecommunications network, either fixed or mobile (not shown).

The wireless access device 2 comprises a plurality of transmit and receive antennas 21, 22. In practice more than two antennas may be employed and the antennas may form an antenna group.

The wireless user devices 2, 3 each comprise two transmit and receive antennas, indicated by reference numerals 31, 32 and 41, 42, respectively. Likewise, the wireless user devices 2, 3 may comprise more than two antennas. However, in practice, the number of antennas of user devices is often limited to two.

Transmission from the wireless access device 2 to a wireless user device 3, 4 is called a forward link or downlink and transmission from a user device 3, 4 to the wireless access device 2 is called a reverse link or uplink. Transmission over the forward and reverse links may be arranged according to any of a wireless access method, such as but not limited to Code Division Multiple Access (CDMA), Time Division Multiple Access (TDMA), Frequency Division Multiple Access (FDMA), Orthogonal Frequency Division Multiple Access (OFDMA), and the like.

Figure 2:
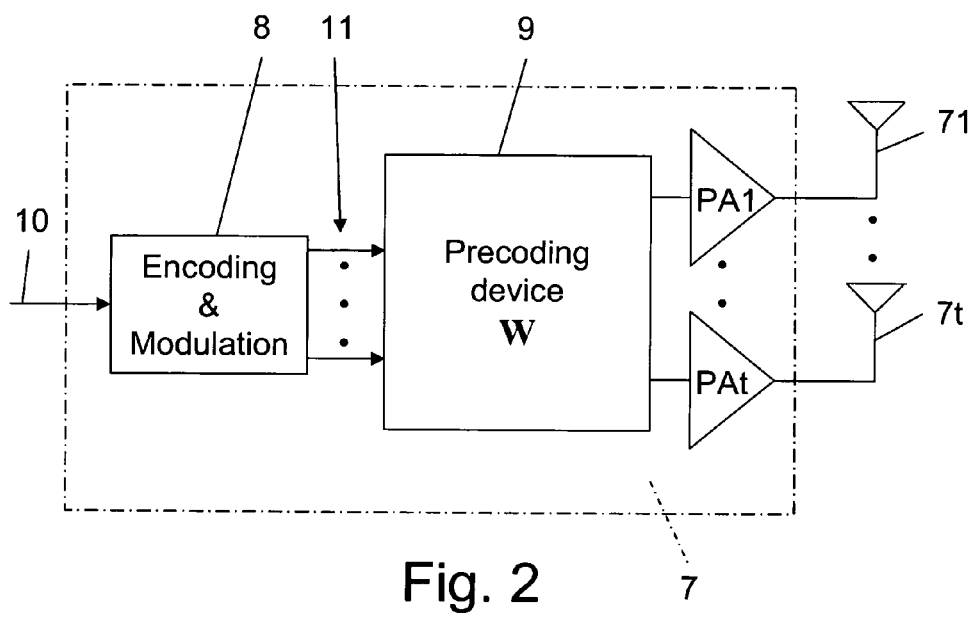
FIG. 2 shows a generalized block diagram of a communication device in accordance with the present invention.

FIG. 2 shows a general block diagram of a transmitter part 7, indicated by dash-dot lines, of any of the access device 2 and a communication device 3, 4, comprising a transmit data signal encoding and modulation device 8 and a precoding device 9 in accordance with the present invention. In the generalized block diagram of FIG. 2 a plurality of transmit antennas 71, . . . , 7t are shown, wherein t is an integer larger than one. Each antenna 71, . . . , 7t or port may be driven by an individual Power Amplfier (PA), PA1, . . . , PAt. However, groups of antennas 71, . . . , 7t or ports may also be driven by a single PA (not shown). The PA's may also form part of the precoding device 9.

The encoding and modulation device 8 receives at its input 10 data signals to be transmitted and provides at its outputs 11 a plurality of data signals to the precoding device 9. The type of encoding and modulation performed by the encoding and modulation device 8 is determined by a particular access scheme, as indicated above.

In a MIMO system, the data signals transmitted from the antennas 71, . . . , 7t over a wireless propagation path, such as a wireless propagation path, are received by a plurality of receive antennas.

Figure 3:
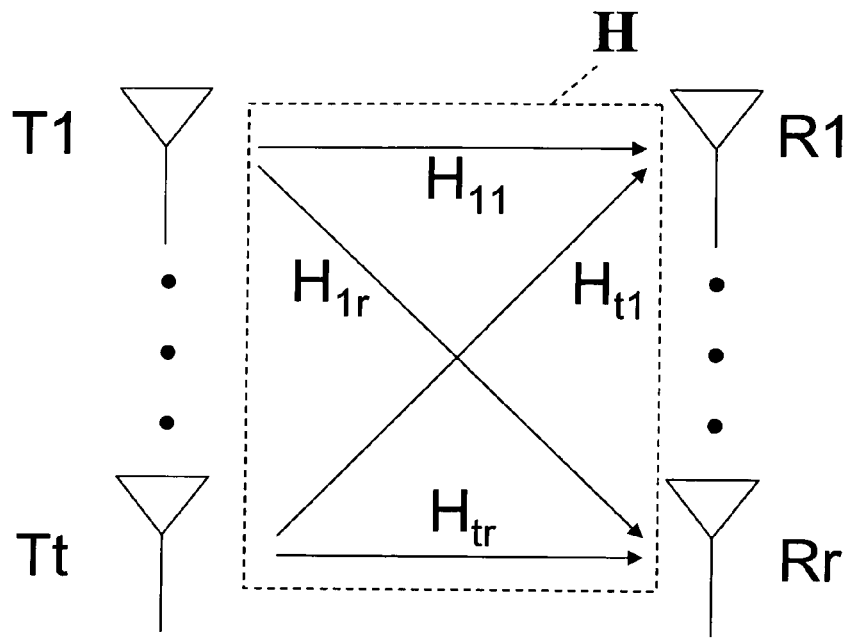
FIG. 3 shows, in a schematic manner, a generalized wireless MIMO channel.

FIG. 3 shows a generalized wireless MIMO channel. The transmit side comprises a plurality of transmit antennas, designated T1, . . . , Tt and the receive side comprises a plurality of receive antennas, designated R1, . . . , Rr wherein t, r are integers greater than one. A signal path from antenna T1 to antenna R1 is designated $H_{11}$. A signal path from antenna Tt to antenna R1 is designated $H_{t1}$. A signal path from antenna Tt to antenna Rr is designated $H_{tr}$. The designation of the other transmission paths will be straightforward. The transmission paths $H_{11}$, . . . , $H_{t1}$, . . . , $H_{tr}$ can be written in matrix from, providing a so-called complex channel matrix H of the MIMO channel. The channel matrix H expresses the amplitude attenuation and phase retardation of the transmit signals over the MIMO transmission channel. That is, the complex transfer function from all transmit antennas to all receive antennas.

In accordance with the invention, precoding is applied to the transmit data signals emitted from each of the transmit antennas, with appropriate weighting. In practice, one has to face power constraints for each of the transmit signals, among others imposed by power amplifier limitations.

The present invention provides an easy to implement precoding technique expressed in a precoding matrix that, given a set of power constraints for the individual transmit data signals, performs optimal data transmission over a wireless MIMO channel. The precoding matrix expresses the power distribution at the individual transmit signals. That is, a basis not necessarily unitary or orthogonal.

The precoding technique of the invention solves the practical problem of having to deal with power constraints, among others PA limitations, and the precoding is available in closed-form and, thus, very easy to implement. Furthermore, the developed and constrained precoding of the invention has a performance (in terms of capacity of the Rayleigh fading channel) that is very close to that of an unconstrained and waterfilling-based precoder design.

In the remainder, the following notation will be adhered to: Upper (lower) case bold-face letters are used for matrices (vectors). The function det(A) denotes the determinant of the matrix A, and α=eig(A) denotes the eigenvalues of the matrix A collected in the vector α. Superscript$^T$ denotes transpose, and superscript$^H$ denotes the complex-conjugate transpose (Hermitian). E{·} is the statistical expectation operator, and diag(x) is the diagonal matrix with the vector x on its main diagonal. Finally, I denotes the identity matrix, and $[A]_{ii}$ denotes the $i^{th}$ diagonal element of the matrix A.

Figure 4:
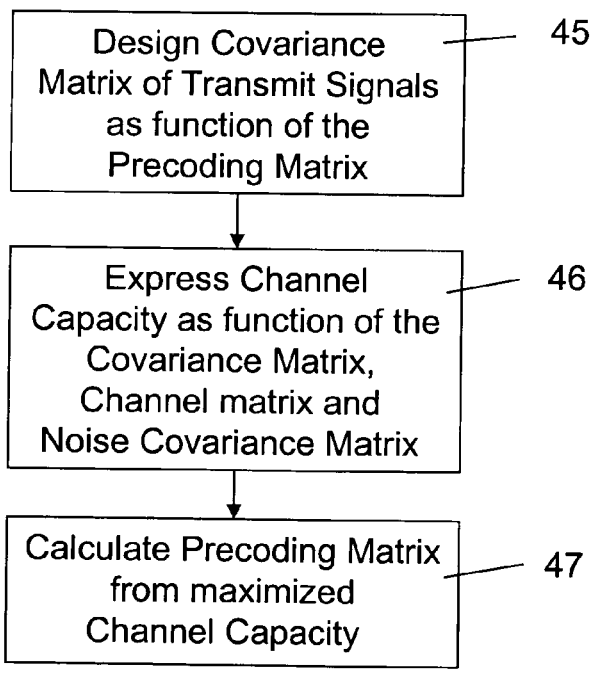
FIGS. 4, 5 show, in a schematic and illustrative flow chart diagram, examples of the method according to the invention.

With reference to FIG. 4, the overall goal is, given a set of power constraints, to maximize the channel capacity and it is assumed that the channel matrix is full rank, i.e., its rank equals the number of transmit antennas, FIG. 4, block 47. The channel capacity (or conditional mutual information of the random channel) of a fixed MIMO channel is given by:

$$C(R) = \log \det(I + R_n^{-1} H R H^H) \quad (1)$$

wherein C(R) is the channel capacity expressed in bps/Hz, I is the identity matrix, H is the r×t (number of receive antennas)× (number of transmit antennas) MIMO channel matrix, see FIG. 3, $R_n$ is the complex noise covariance matrix, expressed as the noise power, and R is the complex covariance matrix of the signals transmitted over the antennas. This precoder covariance matrix expresses a power of the precoder. See FIG. 4, block 46. The noise covariance matrix, among others, depends on the Interference level in the transmission system. Interference in a cellular transmission is, among others, comprised by the frequency/code reuse scheme of transmission technique employed, the cell size, uplink/downlink perspective, deployment geometry, propagation conditions and antenna types.

The aim, according to the invention, is to design the precoder covariance matrix:

$$R = WW^H \quad (2)$$

wherein W is the sought after precoding matrix, FIG. 4, block 45, in such way that C(R) in (1) is maximized over the following set of individual power constraints:

$$\text{diag}(R) = [p_1, p_2, \ldots, p_t]^T \quad (3)$$

wherein $p_1, p_2, \ldots, p_t$ are the individual power constraints relating to the transmit data signals transmitted by the antennas 1, 2, . . . , t.

Figure 5:
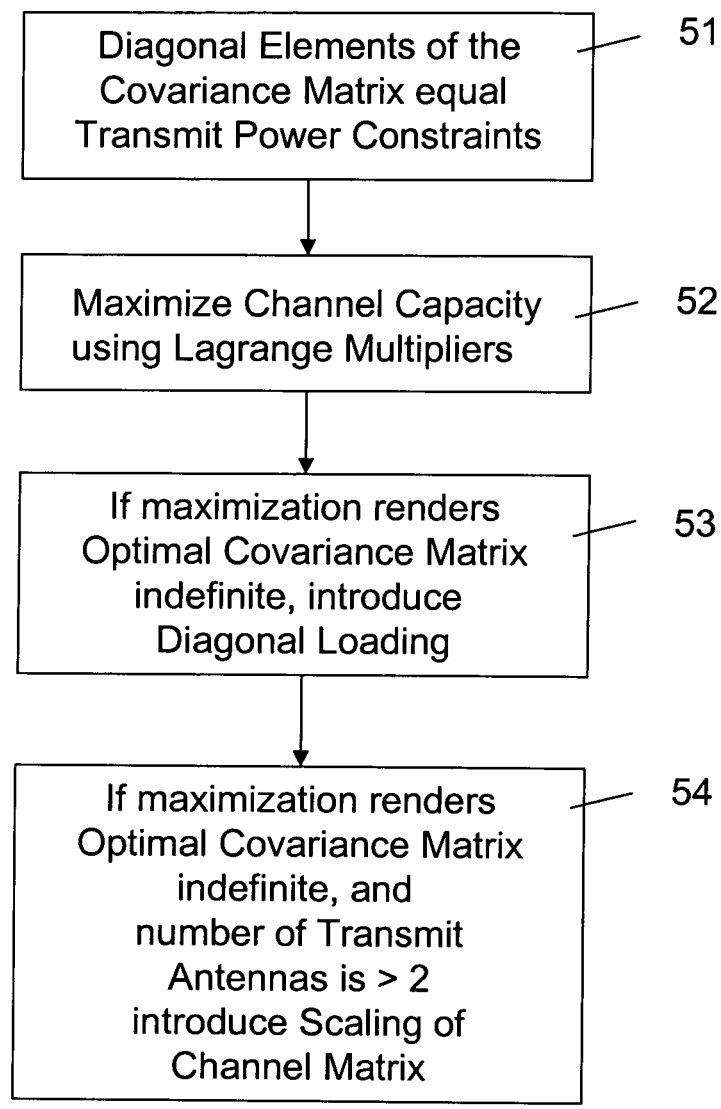

Thus, the diagonal elements of R should equal the transmit power constraint of each antenna element, FIG. 5, block 51. Since C(R) is concave with respect to all positive definite matrices R and all the power constraints are affine, which makes it a convex optimization problem, the maximizing argument is unique and can be found by using the method of Lagrange multipliers, FIG. 5 block 52. The Lagrangian L to this problem is given by:

$$L(R, \lambda) = \log\det(I + H^H R_n^{-1} HR) - \sum_{i=1}^{t} \lambda_i (e_i^T - Re_i - pi) \quad (4)$$

wherein $e_i$ is a column vector with all zeros except for a one in the position and $i^{th}$ position and $\lambda_i$ is the $i^{th}$ Lagrange multiplier. The multipliers are collected in the vector $\lambda = [\lambda_1, \lambda_2, \ldots, \lambda_t]^T$. Observe that the identity log det(I+AB)=log det(I+BA) has been used. The solution is found by equating the derivative of $L(R,\lambda)$ with respect to R to zero and solving for R. The derivative becomes somewhat intricate because of the complex-valued matrix argument. However, it can be shown that the derivative is given by:

$$\delta L(R,\lambda)/\delta R = V^T(I+R^TV^T)^{-}-\Lambda \quad (5)$$

wherein $\Lambda$ is the diagonal matrix $\Lambda=\text{diag}(\lambda)$ and $V=H^HR_n^{-1}H$. The present derivative is valid for the natural logarithm while the capacity formula uses the base-2 logarithm. However, the scaling factor is removed since it does not affect the solution.

Now, if the derivative is equated to zero it yields (after some manipulations):

$$R_{opt}=\Lambda^{-1}-V^{-1} \quad (6)$$

Thus, since the diagonal elements of $R_{opt}$ are given by $[R]_{ii}=p_i$, the multipliers are given by:

$$\lambda_i=1/(p_i+[V^{-1}]_{ii}) \; i=1,2,\ldots,t \quad (7)$$

Back substituting, in order to find the optimal covariance matrix $R_{opt}$ then yields:

$$R_{opt}=\text{diag}(p_1+[V^{-1}]_{11}, p_2+[V^{-1}]_{22}, \ldots, p_t+[V^{-1}]_{tt}) - V^{-1} \quad (8)$$

Finally, the optimal precoding matrix is given by the Hermitian square-root of $R_{opt}$, ie., $$W_{opt}=R_{opt}^{1/2} \quad (9)$$

or alternatively by $$W_{opt}=Q_{opt}D_{opt}^{1/2} \quad (10)$$

wherein $R_{opt}=Q_{opt}D_{opt}Q_{opt}^H$ is the eigendecomposition of $R_{opt}$. Note that the closed-form solution (9) is derived under the assumption that the matrix $V=H^HR_n^{-1}H$ is nonsingular. The above solution is, thus, only valid for non-singular such matrices, and the assumption of full rank channel matrices guarantees non-singularity (assuming that the noise covariance matrix is full rank).

The full channel rank requirement typically requires that the number of transmit antennas is smaller or equal to the number of receive antennas, i.e., $t \geq r$. However, if the matrix is singular one can always solve the Lagrange optimization problem by using standard numerical optimization techniques.

Another remark is that the requirement that the precoder covariance matrix R is positive (semi)definite has been relaxed in the derivation of the closed-form precoding. For too small power levels $\{p_1, p_2, \ldots, p_t\}$ equation (8) might thus render an indefinite matrix which makes the solution erroneous. Nonetheless, if the solution given by equation (10) becomes indefinite for systems equipped with two transmit antennas and two or more receive antennas, then it can simply be made positive semidefinite by introducing diagonal loading, FIG. 5, block 53. The diagonal loading is done by adding to the original (and indefinite) $R_{opt}$ an identity matrix that is scaled by the absolute value of the smallest eigenvalue of $R_{opt}$ given by equation (9) followed by a scaling of the matrix such that the power constraints are fulfilled, i.e., the modification is performed according to:

$$C=R_{opt}+|\min(\text{eig}(R_{opt}),0)|I \quad (11)$$

$$R_{opt,new}=(p/[C]_{11})C \quad (12)$$

wherein uniform power constraints have been assumed, i.e., $p=p_1=p_2$, which is common in practical systems, and $\|\cdot\|$ denotes the absolute value of the parameter.

The modification given by equations (11) and (12) renders a new 2×2 matrix $R_{opt,new}$ that is now positive semidefinite and singular (cf. rank-one beamforming since the modified matrix has an eigenvalue equal to zero).

For larger MIMO systems with more than two transmit antennas an indefinite $R_{opt}$ can be made positive semidefinite by replacing $V^{-1}$ in equation (8) by a scaled matrix $cV^{-1}$. Here, c is a real scalar in the interval [0,1] that should be chosen as the largest number in this interval that makes $R_{opt}$ positive semidefinite, FIG. 5, block 54.

Figure 6:
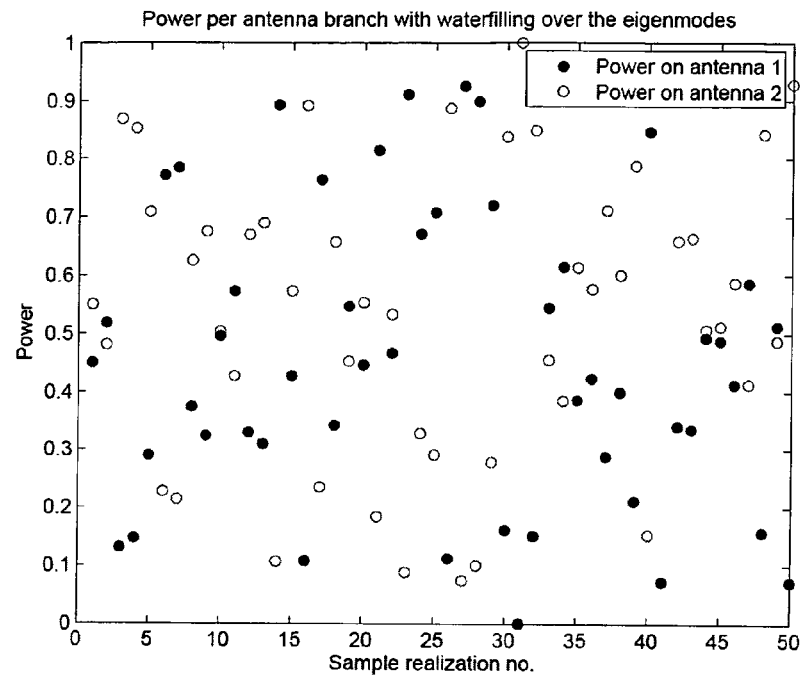
FIGS. 6, 7 and 8 show graphs of illustrative examples of a prior art precoding, of a precoding in accordance with the present invention and a comparison of prior art precoding, precoding according to the invention and no precoding at all, respectively.

The following is an illustrative example of the precoding according to the invention. Consider the problem of precoding of a 2×2 Rayleigh fading MIMO channel which experiences correlated fading at both transmit and receive sides. A basic schematic of the transmitter is shown in FIG. 2. In FIG. 6 the power levels per antenna, also called antenna branch, attained by a total transmit power constraint and waterfilling are displayed with respect to 50 independent Rayleigh channel realizations, according to the prior art. The total power is in this example set to unity and one can see that the sum of the powers per antenna (the filled and non-filled circles), thus, equals unity.

Figure 7:
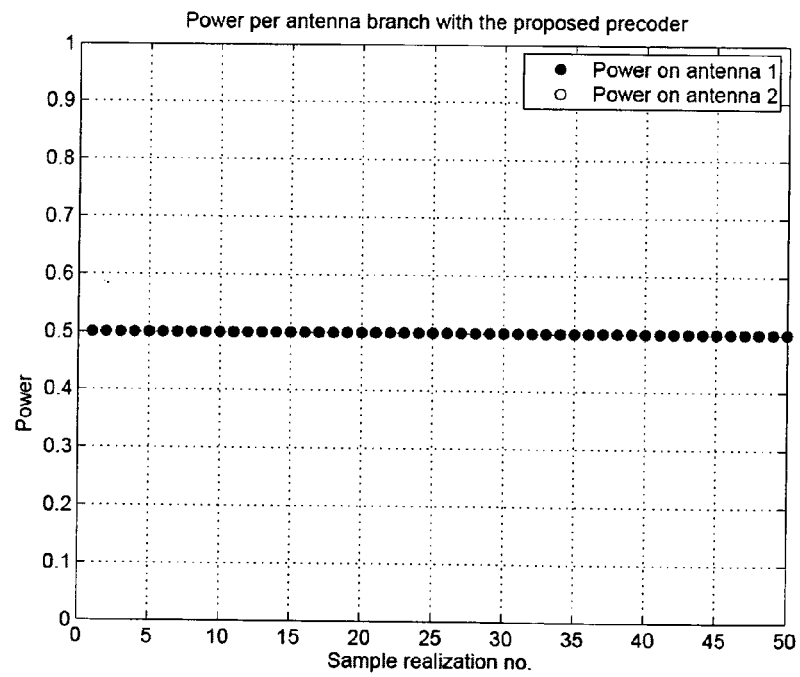

There is, however, great spread between the two antenna powers and if there was a power constraint on each antenna of, say, 0.5, it would saturate the power amplifiers greatly if no action is taken. The remedy is to use the precoding according to the invention having per antenna power constraints. FIG. 7 shows how the powers are constrained at 0.5 for each Rayleigh channel realization for the proposed precoder.

Figure 8:
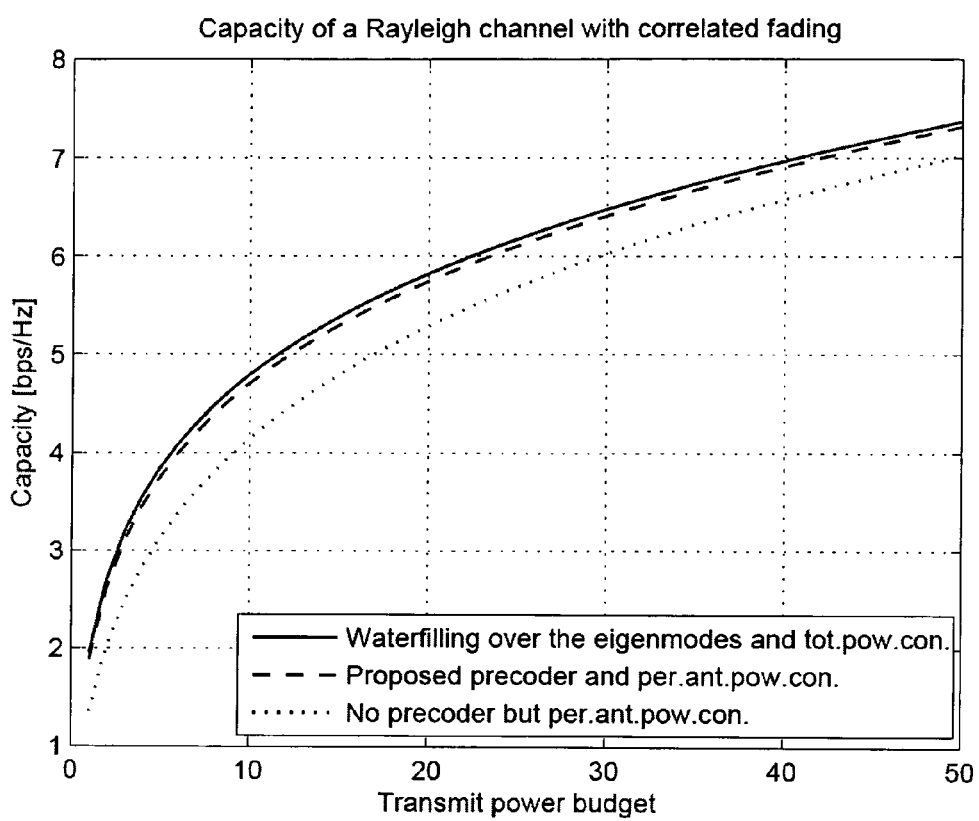

FIG. 8 shows the ergodic capacity for three systems averaged over 5000 independent Rayleigh channel realizations, namely, (i) total transmit power constraint with waterfilling over the orthogonal eigenmodes without any PA constraints, according to the prior art, (ii) the proposed per antenna power constrained precoder according to the invention, and (iii) no precoding but with per antenna power constraints. One can see that there is little performance loss in introducing per antenna power constraints compared to only having a total power constraint, and that all the curves coincide at high power levels as expected. In this example the channel matrix was normalized such that all the elements of H have unit variance. The total transmit power budget, thus, represents two times the average SNR (in linear scale) per receive antenna.

Existing methods render infeasible solutions since the PA's in practical implementations can not deliver the required power distribution. The reason for this is that the power is limited per PA and not in total power. Unlike existing methods, the precoding according to the present inventions takes the PA limitations into account and uses all of the PA resources to their maximum. Finally, unlike existing waterfilling-based precoders it is also easily implemented in practice whenever its closed-form solution is valid.

The precoding scheme according to the invention also works when parts of the transmit resources for some reasons are made unavailable (e.g., preallocated to control channels, other users, etc.).

The invention is not restricted to the examples disclosed above and illustrated in the drawings.

The invention claimed is:

1. A method of precoding transmit data signals in a wireless Multiple-Input Multiple-Output (MIMO) channel transmission scheme for maximizing channel capacity of said MIMO channel transmission scheme given transmit power constraints having individual transmit power amplifier output power limitations, comprising:

defining a precoder covariance matrix of transmit antenna signals of said MIMO channel transmission scheme as a matrix product of a precoding matrix representing said precoding of said transmit data signals and an Hermitian of said precoding matrix, real valued diagonal elements of said precoder covariance matrix representing said transmit power constraints, and said channel capacity being a function of said precoder covariance matrix, a channel matrix and a noise covariance matrix; and calculating said precoding matrix by maximizing said channel capacity.

2. The method according to claim 1, wherein said channel matrix has a dimension equal to a number of transmit antennas and receive antennas of said MIMO channel transmission scheme.

3. The method according to claim 1, wherein said precoder covariance matrix is a complex precoder covariance matrix.

4. The method according to claim 1, wherein real said valued diagonal elements of said precoder covariance matrix equal said transmit power constraints.

5. The method according to claim 1, wherein said precoding matrix is a complex precoding matrix.

6. The method according to claim 1, wherein said channel capacity is maximized using a method of Lagrange multipliers, taking said individual transmit power amplifier output power limitations into account.

7. The method according to claim 1, wherein said channel matrix and said noise covariance matrix are full rank.

8. The method according to claim 1, wherein said channel matrix has a dimension equal to a number of transmit antennas and receive antennas of said MIMO channel transmission scheme, said number of transmit antennas equaling two and if maximizing said channel capacity renders an optimal precoder covariance matrix indefinite, diagonal loading is introduced, by adding to said optimal precoder covariance matrix, an identity matrix scaled by a magnitude of a smallest eigenvalue of said optimal precoder covariance matrix.

9. The method according to claim 1, wherein said channel matrix has a dimension equal to a number of transmit antennas and receive antennas of said MIMO channel transmission scheme, said number of transmit antennas being larger than two and if maximizing said channel capacity renders an optimal precoder covariance matrix indefinite, a scaling of said channel matrix being introduced by multiplying said channel matrix by a scalar in an interval zero to one and choosing said scalar such that said optimal precoder covariance matrix becomes positive semi-definite.

10. A communication device comprising a transmit data signal encoding and modulation device cascaded by a precoding device for precoding transmit data signals in a wireless Multiple-Input Multiple-Output (MIMO) channel transmission scheme given transmit power constraints having individual transmit power amplifier output power limitations, said precoding device comprising multiple transmit data signal outputs and configured to:

define a precoder covariance matrix of transmit antenna signals of said MIMO channel transmission scheme as a matrix product of a precoding matrix representing said preceding of said transmit data signals and an Hermitian of said preceding matrix, real valued diagonal elements of said precoder covariance matrix representing said transmit power constraints, and a channel capacity of said MIMO channel transmission scheme being a function of said precoder covariance matrix, a channel matrix and a noise covariance matrix; and calculate said preceding matrix by maximizing said channel capacity.

11. The communication device according to claim 10, wherein said precoder covariance matrix is a complex precoder covariance matrix.

12. The communication device according to claim 10, wherein said real valued diagonal elements of said precoder covariance matrix equal said transmit power constraints.

13. The communication device according to claim 10, wherein said channel matrix has a dimension equal to a number of transmit antennas and receive antennas of said MIMO channel transmission scheme, said number of transmit antennas equaling two and if maximizing said channel capacity renders an optimal precoder covariance matrix indefinite, diagonal loading is introduced, by adding to said optimal precoder covariance matrix, an identity matrix scaled by a magnitude of a smallest eigenvalue of said optimal precoder covariance matrix.

14. The communication device according to claim 11, comprising at least one power amplifier driving at least two transmit data signal outputs, wherein said transmit power constraints comprise output power limitations of said at least one power amplifier.

15. The communication device according to claim 10, arranged for operating as either one of a wireless access device and a wireless user device in a wireless communication system.

* * * * *

UNITED STATES PATENT AND TRADEMARK OFFICE
CERTIFICATE OF CORRECTION

PATENT NO. : 8,483,310 B2
APPLICATION NO. : 12/919301
DATED : July 9, 2013
INVENTOR(S) : Coldrey et al.

It is certified that error appears in the above-identified patent and that said Letters Patent is hereby corrected as shown below:

On the Title Page, Item (56), under "OTHER PUBLICATIONS", in Column 2, Line 1, delete "et al:" and insert -- et al., --, therefor.

On the Title Page, Item (56), under "OTHER PUBLICATIONS", in Column 2, Lines 1-2, delete "spat;al" and insert -- spatial --, therefor.

On the Title Page, Item (56), under "OTHER PUBLICATIONS", in Column 2, Line 2, delete ".channels"" and insert -- channels" --, therefor.

On the Title Page, Item (56), under "OTHER PUBLICATIONS", in Column 2, Line 6, delete "et al:" and insert -- et al., --, therefor.

In the Specification

In Column 3, Line 51, delete "disclosed above" and insert -- disclosed above. --, therefor.

In Column 5, Line 22, delete "Amplfier" and insert -- Amplifier --, therefor.

In Column 7, Line 6, in Equation (5), delete "$\delta L(R,\lambda)/\delta R = V^T(I+R^T V^T)^{-} - \Lambda$," and insert -- $\delta L(R,\lambda)/\delta R = V^T(I+R^T V^T)^{-1} - \Lambda$ --, therefor.

In Column 7, Lines 7-8, delete "$V = H^H R_n^{-1} H$," and insert -- $\mathbf{V} = \mathbf{H}^H \mathbf{R}_n^{-1} \mathbf{H}$ --, therefor.

In Column 7, Line 25, delete "ie.," and insert -- i.e., --, therefor.

Signed and Sealed this
Fifth Day of November, 2013

Teresa Stanek Rea
*Deputy Director of the United States Patent and Trademark Office*

In Column 7, Line 28, delete "alternatively by" and insert -- alternatively by: --, therefor.

In Column 7, Line 40, delete " $t \geq r.$ " and insert -- $t \leq r.$ --, therefor.

In the Claims

In Columns 9 & 10, Lines 46 & 1, in Claim 10, delete "preceding" and insert -- precoding --, therefor.

In Column 10, Line 10, in Claim 10, delete "preceding of" and insert -- precoding of --, therefor.

In Column 10, Line 11, in Claim 10, delete "preceding" and insert -- precoding --, therefor.

In Column 10, Line 18, in Claim 10, delete "preceding" and insert -- precoding --, therefor.